US012366413B2

(12) United States Patent
Andreae et al.

(10) Patent No.: US 12,366,413 B2
(45) Date of Patent: Jul. 22, 2025

(54) OVEN SLOT COVER

(71) Applicant: SST Systems, Inc., Sturgeon Bay, WI (US)

(72) Inventors: Bradley M. Andreae, Sturgeon Bay, WI (US); Anthony C. Scoville, Sturgeon Bay, WI (US); Joshua Hembel, Sturgeon Bay, WI (US)

(73) Assignee: SST Systems, Inc., Sturgeon Bay, WI (US)

( * ) Notice: Subject to any disclaimer, the term of this patent is extended or adjusted under 35 U.S.C. 154(b) by 115 days.

(21) Appl. No.: 18/479,762

(22) Filed: Oct. 2, 2023

(65) Prior Publication Data

US 2024/0027135 A1 Jan. 25, 2024

Related U.S. Application Data

(62) Division of application No. 16/890,540, filed on Jun. 2, 2020, now Pat. No. 11,774,176.

(51) Int. Cl.

| | |
|---|---|
| ***F27D 99/00*** | (2010.01) |
| ***F27B 9/02*** | (2006.01) |
| ***F27B 9/24*** | (2006.01) |
| ***F27B 9/38*** | (2006.01) |
| ***F27B 17/00*** | (2006.01) |

(52) U.S. Cl.
CPC .......... *F27D 99/0073* (2013.01); *F27B 9/021* (2013.01); *F27B 9/2461* (2013.01); *F27B 9/38* (2013.01); *F27B 17/0016* (2013.01); *F27B 2009/027* (2013.01); *F27B 9/028* (2013.01); *F27B 2009/382* (2013.01)

(58) Field of Classification Search
CPC .... F27D 99/0073; F27B 9/021; F27B 9/2461; F27B 9/38; F27B 17/0016; F27B 9/028; F27B 2009/027; F27B 2009/382
USPC ................................ 132/242, 243, 244, 246
See application file for complete search history.

(56) References Cited

U.S. PATENT DOCUMENTS

| | | | | |
|---|---|---|---|---|
| 905,047 A | | 11/1908 | Bascom | |
| 1,603,014 A | * | 10/1926 | Beasley | C23D 9/00 432/252 |
| 1,858,433 A | * | 5/1932 | Colby | F27B 9/2461 34/236 |
| 1,858,434 A | * | 5/1932 | Colby | F27B 9/2461 34/242 |
| 1,861,465 A | * | 6/1932 | Woodson | F27B 9/243 34/242 |
| 1,870,080 A | * | 8/1932 | Woodson | F27B 9/2461 34/242 |
| 1,962,635 A | | 6/1934 | Christman et al. | |

(Continued)

*Primary Examiner* — Jessee R Roe
*Assistant Examiner* — Michael Aboagye
(74) *Attorney, Agent, or Firm* — Michael Best & Friedrich LLP

(57) ABSTRACT

A closure mechanism to inhibit escape of heat from an oven chamber of a conveyor oven having a conveyor hanger. The closure mechanism includes a plurality of plates configured to couple to a first and second pluralities of connection tabs of a conveyor oven. Each of the plurality of plates include a connection portion, an angled portion configured to extend downward from the connection portion within a slot of the conveyor oven and an engagement portion extending downward from the angled portion to form an engagement surface.

19 Claims, 11 Drawing Sheets

(56) References Cited

U.S. PATENT DOCUMENTS

| | | | | | |
|---|---|---|---|---|---|
| 2,197,550 | A * | 4/1940 | Hinsey | C03B 29/10 | 432/243 |
| 2,724,908 | A | 11/1955 | Shaw | | |
| 3,718,320 | A | 2/1973 | Jespers | | |
| 4,135,906 | A | 1/1979 | Gladieux et al. | | |
| 11,774,176 | B2 * | 10/2023 | Andreae | F27B 9/38 | 432/244 |

* cited by examiner

OVEN SLOT COVER

CROSS-REFERENCE TO RELATED APPLICATIONS

This application is a divisional application of U.S. patent application Ser. No. 16/890,540, filed on Jun. 2, 2020, now U.S. Pat. No. 11,774,176, the entire contents of which is incorporated herein by reference.

BACKGROUND

An oven system can be used to heat treat, dehydrate, clean, and perform a wide variety of other processes upon materials conveyed through the system. The oven system can operate by conveying materials to locations within the oven system through a conveying slot that is formed on a top wall of the oven chamber. The oven system can convey the material in any known manner, such as by conveying individual materials suspended upon hooks, brackets, wires, or other fixtures, or by conveying multiple pieces of materials in baskets, buckets, racks, pallets, and the like. In many cases, it is highly desirable to selectively close the conveying slot to allow a conveyor to move the material through the conveying slot, while ensuring that the temperature of the oven chamber remains consistent.

SUMMARY

In one aspect, the invention provides an oven system. The oven system includes an oven chamber defined by side walls and a top wall. The oven chamber having a slot that extends longitudinally along a length of the top wall oven chamber. The top wall having a first edge portion and a second edge portion that defines a width of the slot. A conveyor rail extending longitudinally along the slot at a position outside of the oven chamber. The conveyor rail defining a conveyance path. A conveyor hanger coupled to and movable along the conveyance path of the conveyor rail. The conveyor hanger being configured to extend through the slot of the oven chamber to support a workpiece within the oven chamber. A first plurality of connection tabs spaced at intervals along the length of the top wall proximate to the first edge portion of the top wall. A second plurality of connection tabs spaced at intervals along the length of the top wall proximate to the second edge portion of the top wall. A closure mechanism coupled to the first and second plurality of connection tabs to inhibit heat from releasing out of the oven chamber, the closure mechanism including a first plurality of plates coupled to the first plurality of connection tabs and a second plurality of plates coupled to the second plurality of connection tabs. The first and second plurality of plates cooperate with each other to close the slot. Each of the first plurality of plates and the second plurality of plates having a connection portion defining a connection aperture, an angled portion extending downward from the connection portion within the slot of the oven chamber, and an engagement portion extending downward from the angled portion to form an engagement surface. The connection aperture of each of the first and second plurality of plates are respectively configured to engage with at least one of the first and second plurality of connection tabs. The first and second plurality of plates are respectively configured to pivot relative to the first and second plurality of connection tabs to selectively close the slot of the oven chamber.

In another aspect, the invention provides a closure mechanism to inhibit heat from releasing out of an oven chamber of a conveyor oven having a conveyor hanger. The closure mechanism configured to be arranged along a first plurality of connection tabs coupled to a first edge portion of a top wall of the conveyor oven and a second plurality of connection tabs arranged along a second edge portion of the top wall of the conveyor oven. The closure mechanism positioned within a slot formed between the first and second edge portions. The closure mechanism includes a plurality of plates configured to couple to each of the first and second plurality of connection tabs of the conveyor oven and being spaced along a longitudinal length of the slot to selectively enclose the slot of the conveyor oven. The plurality of plates defining a first plurality of plates coupled to the first plurality of connection tabs and a second plurality of plates coupled to the second plurality of connection tabs. Each of the plurality of plates includes a connection portion defining a connection aperture that couples the plates to at least one of the first or second plurality of connection tabs, an angled portion configured to extend downward from the connection portion within the slot of the conveyor oven, an engagement portion extending downward from the angled portion to form an engagement surface, the engagement surfaces of the first plurality of plates contacting the engagement surfaces of the second plurality of plates to close the slot of the conveyor oven, and an angled tab that extends from an upstream portion of the engagement portion in relation to an operational direction of the conveyor hanger towards one of the first edge portion or the second edge portion of the top wall.

In another aspect, the invention provides a closure mechanism to inhibit heat from releasing out of an oven chamber of a conveyor oven having a conveyor hanger. The closure mechanism configured to be coupled to a first plurality of connection tabs arranged along a first edge portion of a top wall of the conveyor oven and a second plurality of connection tabs arranged along a second edge portion of the top wall of the conveyor oven. The closure mechanism positioned within a slot formed between the first and second edge portions. The closure mechanism includes a plurality of plates configured to couple to each of the first and second plurality of connection tabs of the conveyor oven and being spaced along a longitudinal length of the slot to selectively enclose the slot of the conveyor oven. The plurality of plates define a first plurality of plates coupled to the first plurality of connection tabs and a second plurality of plates coupled to the second plurality of connection tabs. The plurality of plates define a first plurality of plates coupled to the first plurality of connection tabs and a second plurality of plates coupled to the second plurality of connection tabs. The first and second plurality of plates cooperate to define a first pair of plates and a second pair of plates positioned downstream the first pair of plates in an operational direction of the conveyor hanger. The first and second pair of plates each include one of the first plurality of plates coupled to the first plurality of connection tabs and one of the second plurality of connection tabs coupled to the second plurality of connection tabs. Each of the plurality of plates include a connection portion defining a connection aperture configured to couple the plates to at least one of the first or second plurality of connection tabs, an angled portion extending downward from the connection portion within the slot of the conveyor oven, an engagement portion extending downward from the angled portion to form an engagement surface, the engagement surface of the first plurality of plates contacting the engagement surface of the second plurality of plates to close the slot of the conveyor oven, a first angled tab that extends from an upstream portion of the engagement portion in relation to the operational direction of the conveyor hanger towards one of the first edge portion or the second edge portion of the top wall, a second angled tab that extends from a downstream portion of the engagement portion in relation the operational direction of the conveyor hanger towards one of the first edge portion or the second edge portion of the top wall, and a sealing structure having a body formed of an elastomeric material that spans a top portion of the plurality of plates. The sealing structure having a first portion coupled to the first plurality of connection tabs and a second portion coupled to the second plurality of connection tabs. The first and second pair of plates are spaced apart in a longitudinal direction of the slot to define a gap so the second angled tab of the first pair of plates does not contact the first angled tab of the second pair of plates, thus allowing the conveyor hanger to move in both a first direction and a second direction. The first and second portions of the sealing structure cover the gap between respective plates to close the slot of the oven chamber and inhibit heat from releasing out of the oven chamber.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the accompanying drawings. The invention is capable of other embodiments and of being practiced or of being carried out in various ways.

Figure 1:
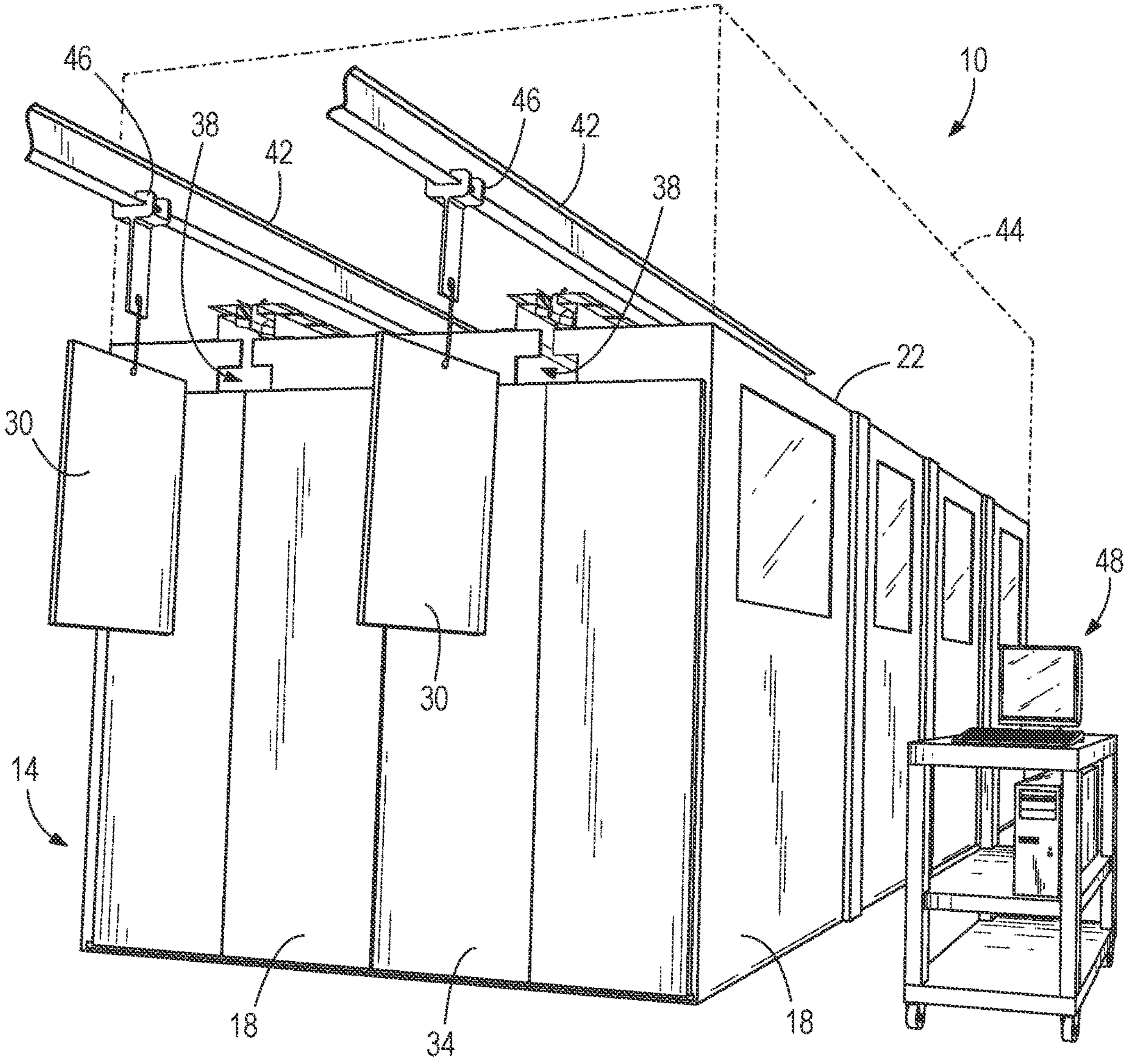
FIG. 1 is a perspective view of an oven system according to an embodiment of the invention.
Figure 2:
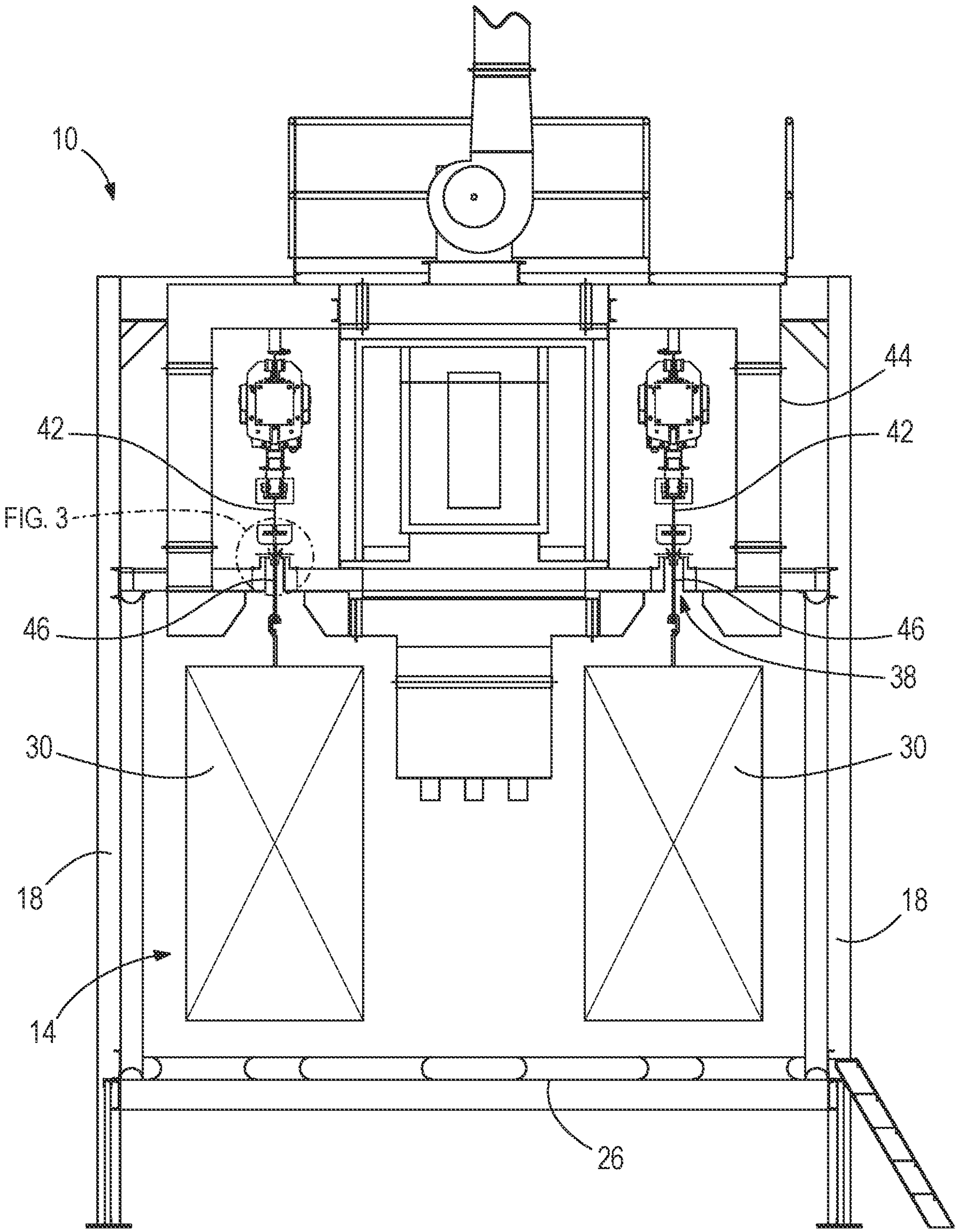
FIG. 2 is a cross-sectional view of the oven system of FIG. 1.

FIGS. 1 and 2 illustrate an oven system 10 including an enclosed oven chamber 14 that is positioned within a workspace (e.g., a factory, warehouse, etc.). The oven chamber 14 can provide a temperature-controlled station along a conveyorized process (e.g., a curing station for a finishing system that applies a coating to workpieces 30, for example by electrocoat, autodeposition, or paint). As used herein, the term "treat" in its various forms refers to any of these conveyorized processes. The oven chamber 14 is defined by side walls 18 and a top wall 22. In some embodiments, the oven chamber 14 may include a bottom wall 26 (FIG. 2) that is elevated above a ground surface (e.g., by pedestals). In other embodiments, the ground surface may form the bottom of the oven chamber 14. The oven system 10 can include any suitable device or system for opening and closing the oven chamber 14 relative to the surrounding workspace. The oven chamber 14 is provided with or is in communication with a heater (not shown) for heating an internal space defined by oven chamber 14 and the workpieces 30 introduced therein. Any type of heater can be employed depending at least partially upon the type of item treatment desired. For example, the heater can comprise one or more gas, oil, propane, or other fuel-burning heaters, electric (e.g., infrared) or other radiant heating elements, microwave heaters, steam or forced air heaters in which fluid is heated utilizing any of these types of heaters, and the like. As used herein, the term "heater" refers to any of such heaters, whether alone or in any combination.

The oven chamber 14 can be provided with an access door 34 that is configured to move in any desired manner between open and closed positions. For example, the access door 34 may be pivotable and/or slidable between the open and closed positions so the workpieces 30 may enter the over chamber 14. It should be appreciated that the access door 34 may be sized for a specific function of the oven system 10 or be a universal access door. Additionally, the access door 34 may form a portion of one or more of the side walls 18 or an entire side wall 18.

Figure 3:
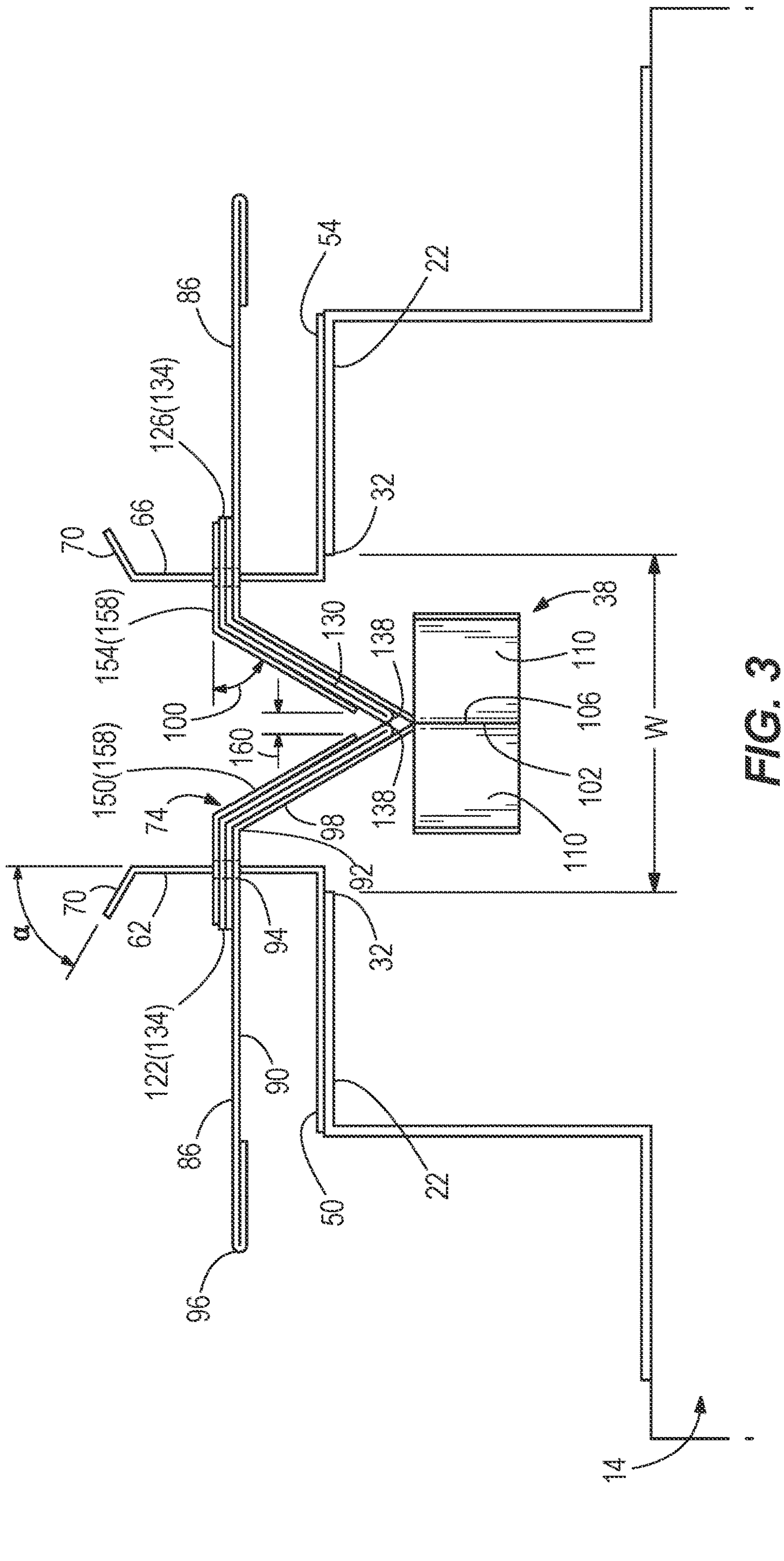
FIG. 3 is a cross-sectional view of a slot of the oven system of FIG. 2 having a closure mechanism according to an embodiment of the invention.

With reference to FIGS. 1 and 3, the oven chamber 14 further defines a slot 38 on the top wall 22 of the oven chamber 14. In other words, the oven chamber 14 is a top slot oven that allows the workpieces 30 to be supported within the oven chamber 14 by structure(s) outside (above) the oven chamber 14. In the illustrated embodiment, the slot 38 defines a width W that extends between juxtaposed edge portions 32 (FIG. 3) of the top wall 22. In other words, the top wall has first and second edge portions 32 that define the width W of the slot.

Now with reference to FIGS. 1 and 2, a conveyor rail 42 extends longitudinally along the slot 38 at a position outside of the oven chamber 14. In the illustrated embodiment, the conveyor rail 42 can be partially surrounded by an enclosure 44. In other embodiments, the conveyor rail 42 may be secured to a ceiling of the workspace, connected to another structure, etc. to define a conveyance path for the material through the slot 38 of the oven chamber 14. The conveyance path is defined along a longitudinal length of the slot 38 and extends the length of the oven chamber 14. The length of the oven chamber 14 is defined as a depth of the oven chamber 14 (e.g., in a Z-coordinate direction). The conveyor rail 42 can be a free rail of a power and free conveyor system having a power rail disposed above the rail 42, although other types of conveyors can also be used with the oven system 10. For example, the workpieces 30 can be conveyed using any combination of chain, belt, cable, tabletop, bucket, and other conveyors, systems employing hydraulic or pneumatic pistons, slides, rails, vibration conveyors, and the like. As used herein, the term "conveyor" refers to any device or system adapted to move parts before, during, and/or after treatment.

A conveyor hanger 46 can extend down from a trolley that is engaged directly with the conveyor rail 42. One or more workpieces 30 are suspended, contained, or otherwise supported on or in the conveyor hanger 46. In the illustrated embodiment, the conveyor hanger 46 extends downward from the conveyor rail 42 through the slot 38 of the oven chamber 14 to support the workpieces 30 within the oven chamber 14. The conveyor hanger 46 is coupled to and movable along the conveyance path of the conveyor rail 42 to heat or treat the material 30 within the oven chamber 14.

With continued reference to FIG. 1, the oven system 10 may include a control station 48 that controls the temperature of the oven chamber 14 and the movement of the conveyor hanger 46 on the conveyor rail 42. In the illustrated embodiment, the control station 48 is a portable station (e.g., a computer) that communicates with the heaters and sensors of the oven chamber 14 and sensors of the conveyor (e.g., via wireless communication protocol such as WiFi, Bluetooth, etc.) to control the temperature of the oven chamber 14 and movement of the conveyor hanger 46 along the conveyor rail 42. In other embodiments, the control station 48 may be integrated with the oven chamber 14 (e.g., formed on the side wall 18 of the oven chamber 14).

Figure 4:
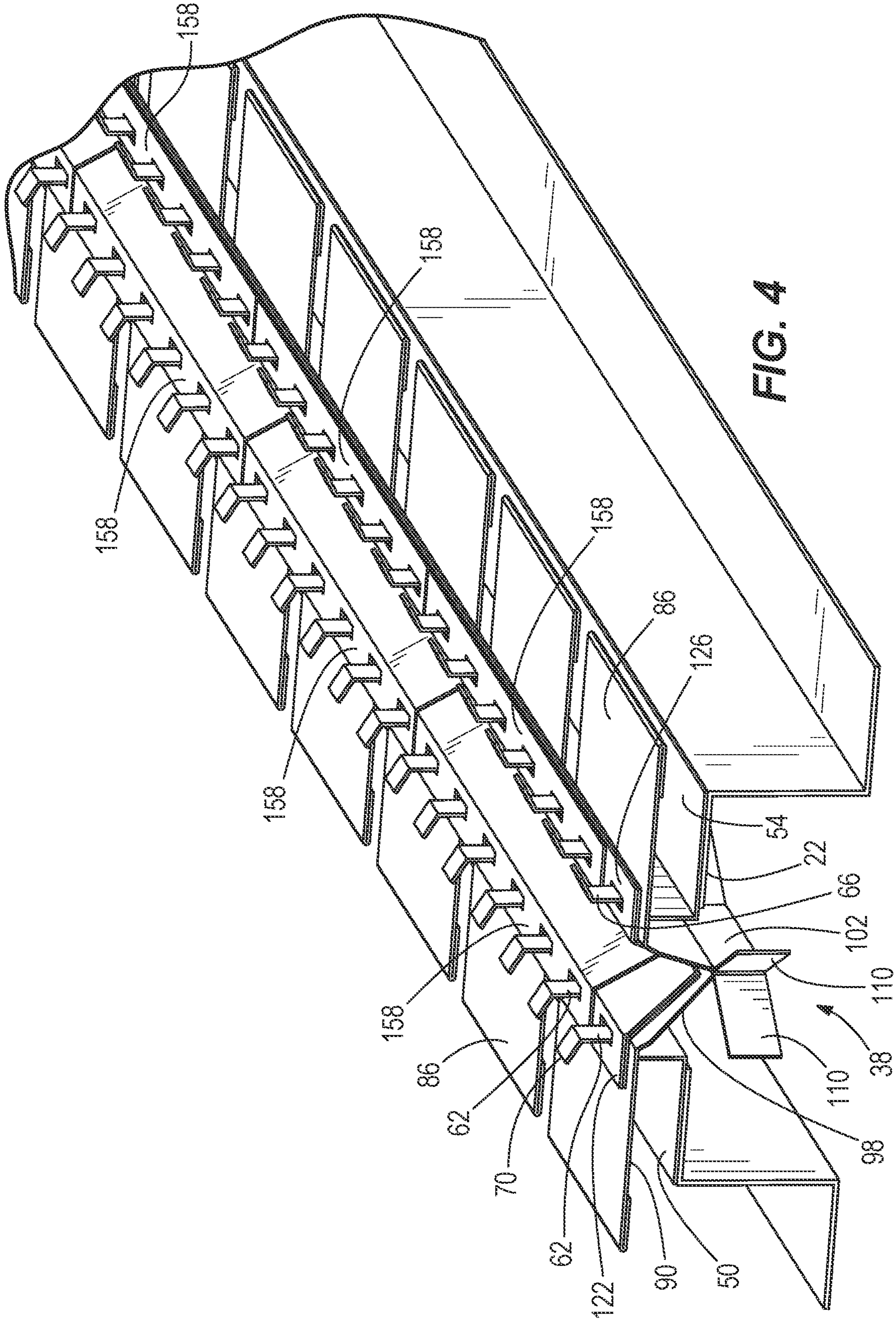
FIG. 4 is a perspective view of the slot of the oven system of FIG. 1 having the closure mechanism.
Figure 5:
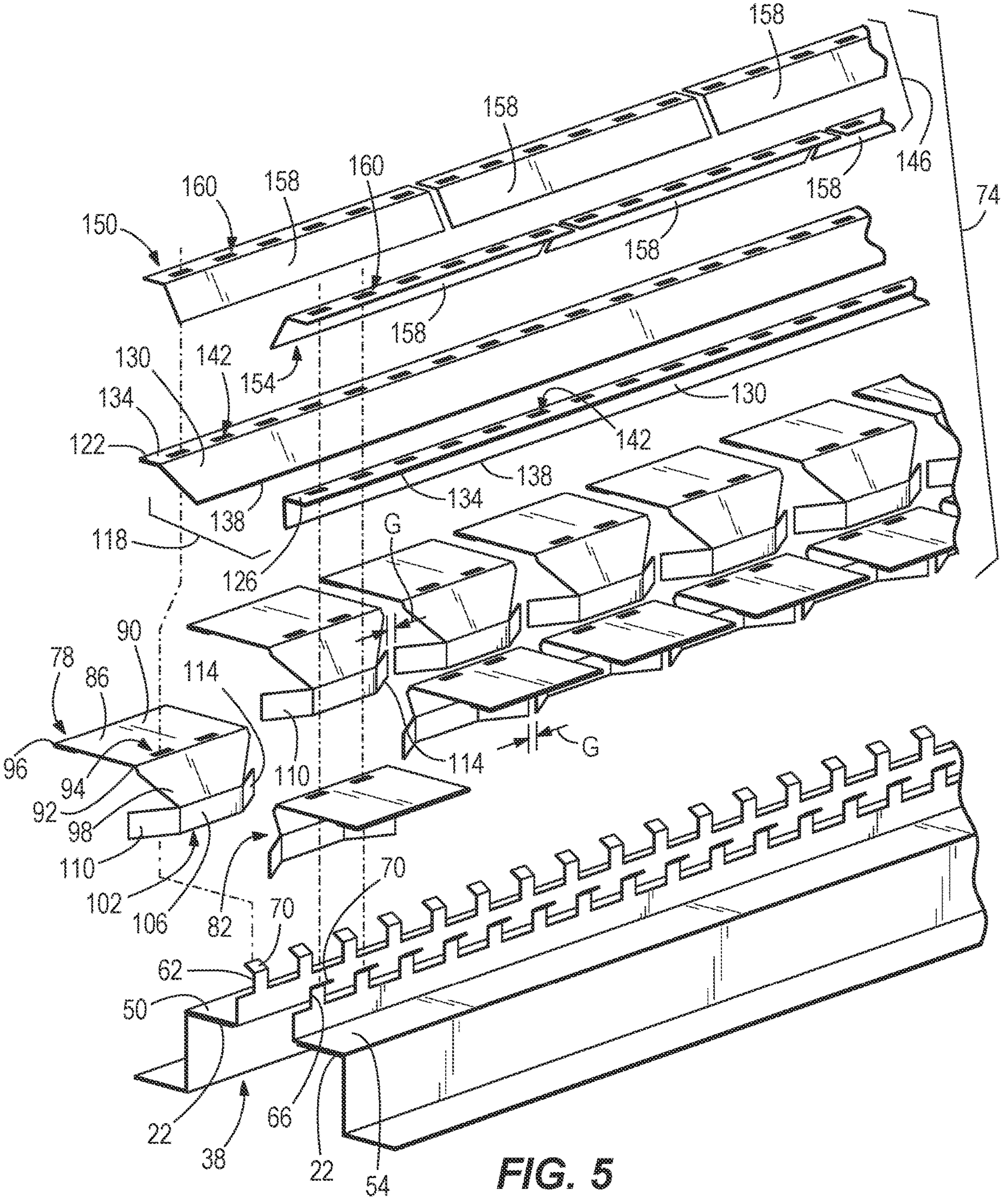
FIG. 5 is an exploded view of the slot having the closure mechanism of FIGS. 1 to 4.

Now with reference to FIGS. 3-5, the oven system 10 includes a first support bracket 50 and a second support bracket 54 that each extend longitudinally along a length of the top wall 22 of the oven chamber 14. In the illustrated embodiment, the first and second support brackets 50, 54 are uniform structures (e.g., each formed as a continuous sheet metal piece) that extend the entire length of the slot 38. For example, the first and second support brackets 50, 54 are L-shaped, and form a first portion that is secured to the top wall 22 of the oven chamber 14 and a second portion that extends perpendicular to the top wall 22. For example, the first and second support brackets 50, 54 may be secured to the top wall 22 by fasteners, welded, etc. In other embodiments, the first and second support brackets 50, 54 may be formed of a plurality of individual sections that are secured to the top wall 22 of the oven chamber 14. The second support bracket 50 is spaced from the first support bracket 54, such that the brackets 50, 54 are positioned along the corresponding edge portions 32 defining the slot 38. In the illustrated embodiment, the first and second support brackets 50, 54 each extend past the corresponding edge portion 32 into the slot 38 as shown in FIG. 3. In other embodiments, the first and second support brackets 50, 54 may be flush with or offset from the end portion of the top wall 22.

The first and second support brackets 50, 54, respectively, include a first plurality of connection tabs 62 and a second plurality of connection tabs 66. The connection tabs within each of the pluralities of connection tabs 62, 66 are spaced at intervals along the length of the top wall 22. In the illustrated embodiment, the connection tabs 62, 66 are spaced along the top wall 22 in a manner that they are parallel to the conveyance path (e.g., shown in FIG. 3) along the depth of the oven chamber (FIG. 1). In other words, the connection tabs 62, 66 are positioned proximate the slot 38 along the length of the conveyance path. For example, the connection tabs 62, 66 may be equally spaced along the top wall 22. In other embodiments, the connection tabs 62, 66 may be unevenly spaced along the length of the top wall 22. In the illustrated embodiment, the support brackets 50, 54 are separate structures that are attached to the top wall 22 of the oven chamber 14. In other embodiments, the support brackets 50, 54 may be formed as a portion of the top wall 22 such that the connection tabs 62, 66 are coupled directly to the top wall 22.

With continued reference to FIGS. 3-5, each of the connection tabs 62, 66 include an angled securing portion 70. The angled securing portion 70 is bent at an angle α relative to a first portion of the connection tabs 62, 66 so a closure mechanism 74 (FIG. 5) may be pivotably connected to each of the first and second support brackets 50, 54. In some embodiments, the angle α is in a range from 10 degrees to 60 degrees. In the illustrated embodiment, the angle α is in a range from 20 to 40 degrees. Also in the illustrated embodiment, the closure mechanism 74 is secured to each of the first and second support brackets 50, 54 solely by a gravitational weight force of the closure mechanism 74, so no additional hardware is required. The angled securing portion 70 of the connection tabs 62, 66 restricts the closure mechanism 74 from sliding off the connection tabs 62, 66 when the conveyor 42 is in operation, and therefore secures the closure mechanism 74 on the support brackets 50, 54. In illustrated embodiment, the connection tabs 62, 66 have a rectangular cross-section. It should be appreciated that the connection tabs 62, 66 may be formed to have any cross-section that allows the closure mechanism 74 to be secured to the support brackets 50, 54. In this regard, the connection tabs 62, 66 can take, for example, other shapes such as pins, posts, walls, or any other projections (along with tabs 62 disclosed herein, collectively referred to herein simply as "tabs" for ease of reference) suitable for securing the closure mechanism 74 with respect to the support brackets 50, 54 as described herein.

With continued reference to FIGS. 5, the closure mechanism 74 according to one embodiment of the invention is illustrated. The closure mechanism 74 is coupled to the first and second support brackets 50, 54 to inhibit heat from being released out of the oven chamber 14. In the illustrated embodiment, the closure mechanism 74 includes a first plurality of plates 78 coupled to the first support bracket 50 and a second plurality of plates 82 coupled to the second support bracket 54. The first and second plurality of plates 78, 82 cooperating with each other to close the slot 38 of the oven chamber 14 (FIGS. 3 and 4). In the illustrated embodiment, the first and second plurality of plates 78, 82 each include a plurality of identical plates 86, which are illustrated in detail in FIG. 7. In some embodiments, the first or entrance plate of the first and second plurality of plates 78, 82 may be formed differently than the remainder of the plates 86 to better ensure various conveyor hangers 46 can enter the slot 38.

Figure 7:
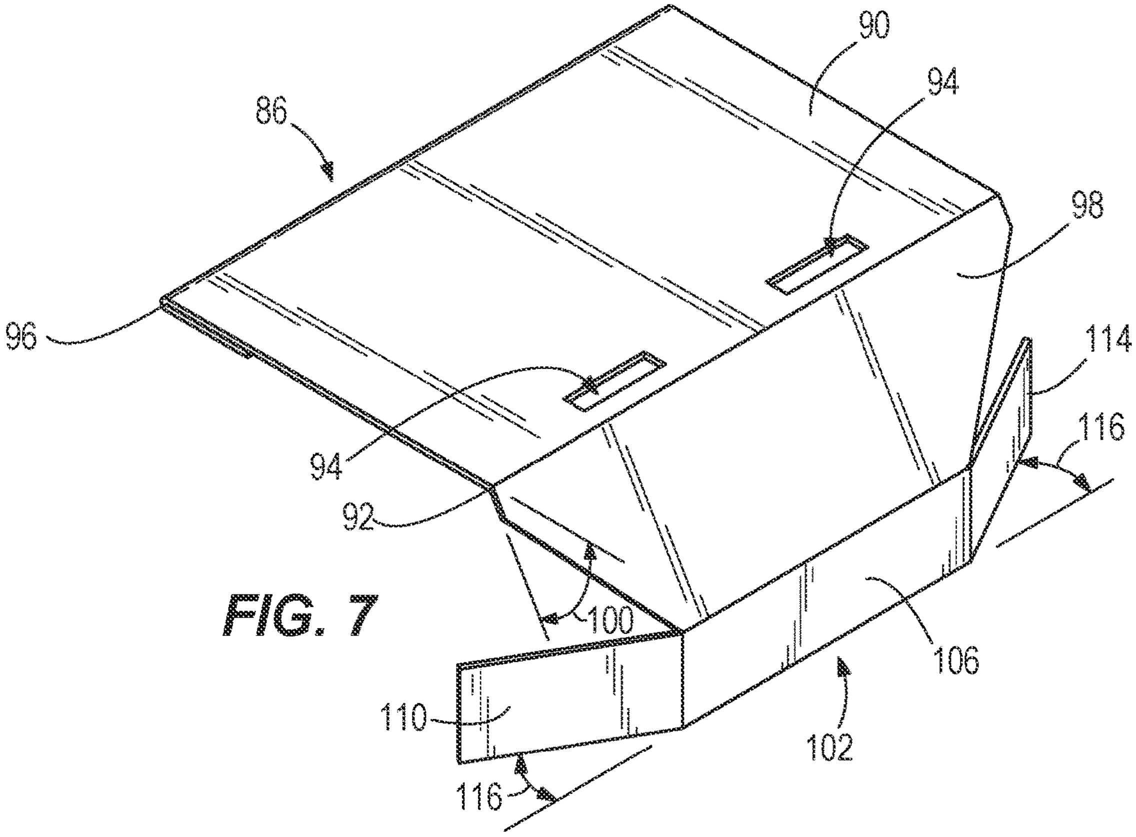
FIG. 7 is a perspective view of a single plate of the closure mechanism of FIG. 3-5.

With reference to FIGS. 5 and 7, each plate 86 includes a connection portion 90 defining a connection aperture 94, an angled portion 98 extending downward from the connection portion 90 within the slot 38 of the oven chamber 14, and an engagement portion 102 extending downward from the angled portion 98 to form an engagement surface 106. The plate 86 further includes a first angled tab 110 extending from an upstream portion of the engagement portion 102 and a second angled tab 114 that extends from a downstream portion of the engagement portion 102.

Each connection aperture 94 of the plate 86 is sized to receive at least one connection tab 62, 66 to so the plate 86 can be secured to at least one of the first and second plurality of connection tabs 62, 66. As a result, each plate 86 is respectively configured to pivot relative to the connection tabs 62, 66 on which it is supported for cooperating with another one of the plates 86 at a given position along the length of the slot 38 of the oven chamber 14 to selectively close the slot 38 (FIG. 4). In the illustrated embodiment, the connection portion 90 defines two connection apertures 94. In other embodiments, the connection portion 90 may define a single connection aperture 94 or more than two connection apertures 94.

When the plate 86 is coupled to one of the connection tab 62, 66, the connection portion 90 has a first end 92 positioned within the width W (FIG. 3) of the slot 38 and a second end 96 that extends a distance beyond the width W of the slot 38. Each connection aperture 94 is positioned proximate the first end 92 of the connection portion 90 to define a fulcrum about which each plate 86 pivots. The connection portion 90 extends a distance beyond the connection tabs 62, 66 to the second end 96 of the plate 86 to define a lever or counterweight portion that urges the plate 86 towards a resting or closed position (FIG. 4) without the need of an additional spring force or biasing member. In the illustrated embodiment, the second end 96 of the plate 86 has a folded portion that increases a gravitational weight force of the second end 96 of the connection portion 90 to form the counterweight portion. The counterweight portion opposes the gravitational weight of a portion of the plate 86 positioned within the slot 38 (e.g., the angled portion 98, the engagement portion 102) so the plate 86 is urged towards the closed position (FIG. 4). In other words, the counterweight portion creates a moment of force on the fulcrum that each plate 86 pivots that is approximately equal to or greater than a moment of force created by the portion of the plate 86 positioned within the slot 38 to urge the plate 86 towards the closed position. In other embodiments, the counterweight portion may be alternatively formed.

With reference to FIGS. 3 and 7, the angled portion 98 has a first end that extends from the connection portion 90 at an angle 100. In some embodiments, the angle 100 may be in a range from 45 degrees to 70 degrees. In the illustrated embodiment, the angle 100 is in a range from 55 degrees to 65 degrees. The angled portion 98 extends from the first end to a second end that, in the illustrated embodiment, is positioned approximately midway within the width W of the slot 38 (FIGS. 3 and 4). The angled portion 98 of the illustrated embodiment further includes a tapered profile such that a width of the angled portion 98 (e.g., that extends along the length of the top wall 22 and the conveyance path (FIG. 4)) consistently decreases as the angled portion 98 extends towards the engagement portion 102. In the illustrated embodiment, the engagement portion 102 extends from the angled portion 98 such that the engagement portion 102 is positioned approximately midway within the width W of the slot 38, and is perpendicular to the connection portion 90. In this and other embodiments, the engagement portion 102 is positioned at a point between the first and second edges 32 (FIG. 3) that is within the width of the slot 38.

Although the closure mechanism 74 shown in FIGS. 3-7 includes plates 86 as described and illustrated herein, the plates 86 need not necessarily have all of the features disclosed herein. By way of example only, the plates 86 need not necessarily be thin as shown, and in other embodiments can be substantially thicker or even block-like elements (still referred to herein as "plates" for ease of reference). Thicker plates 86 can exist, for example, in cases where alternative plate materials are used, such as plates 86 made of insulative materials. Also, the plates 86 in other embodiments can include portions angled as described above to present the same surfaces as tabs 110, but not necessarily having the same thin and/or protruding features as shown in the illustrated embodiment. As yet another example, while the engagement portion 102 of the plates 86 in the illustrated embodiment is perpendicular to the connection portion 90, in other embodiments the engagement portion 102 presents other (non-perpendicular) angles with respect to the connection portion 90 while still performing the same functions of the engagement portion 102 described herein.

With continued reference to the illustrated embodiment, the first and second angled tabs 110, 114 extend from the engagement portion 102 such that a gap G is formed between respective plates 86 (FIG. 5). The first and second angled tabs 110, 114 each extend at an angle 116 relative to the engagement portion 102. The first angled tab 110 extends from the engagement portion 102 towards one of the edge portions 32 (FIG. 3) of the top wall 22, and the second angled tab 114 extends from the engagement portion 102 towards one of the edge portions 32 of the top wall 22. In some embodiments, the angle 116 may be in a range from 20 degrees to 40 degrees. In the illustrated embodiment, the angle 116 is in a range from 25 to 35 degrees. As discussed in more detail below, the construction of the first and second angled tabs 110, 114 that forms the gap G between plates 86 provides engagement surfaces for the conveyor hanger 46 so the conveyor hanger 46 may move bi-directionally within the slot 38 during operation of the conveyor 42.

With continued reference to FIG. 5, the illustrated closure mechanism 74 further includes a sealing structure 118 having a first portion 122 coupled to the first plurality of connection tabs 62 and a second portion 126 coupled to the second plurality of connection tabs 66. Each of the first and second portions 122, 126 of the sealing structure 118 include a body 130 having a first end 134 and a second end 138. The body 130 of the first and second portions 122, 126 of the sealing structure 118 is formed of an elastomeric material that deforms when the conveyor hanger 46 moves through the slot 38 of the oven chamber 14. For example, the body 130 may be formed of a polytetrafluoroethylene (PTFE)-coated fabric so the body 130 can deform and pinch conveyor hanger 46 during operation of the conveyor 42.

The body 130 defines connection apertures 142 that are positioned adjacent the first end 134, and are sized to receive the connection tabs 62, 66 of respective support brackets 50, 54. In the illustrated embodiment, the first and second portions 122, 126 of the sealing structure 118 are constructed with a uniform or continuous body 130 that spans a top portion of the first and second plurality of plates 78, 82 respectively. In other embodiments, the sealing structure 118 may be formed of multiple structures that each have a body that spans one or more of the first and second plurality of plates 78, 82.

As illustrated in FIG. 3, the closure mechanism 74 is urged towards a resting or closed position, which causes the second end 138 of each of the first and second portions 122, 126 of the sealing structure 118 to contact each other. When the second end 138 of the first and second portions 122, 126 are in contact, the sealing structure 118 closes or seals the oven chamber 14 by covering the gaps G (FIG. 5) formed between respective plates 86 of the first and second plurality of plates 78, 82. As a result, the sealing structure 118 restricts heat (e.g., in the form of heated air flow) from within oven chamber 14 from releasing into the surrounding workspace. It should be appreciated that the term "seal" means that the sealing structure 118 limits heat from releasing from the oven chamber 14, which can help keep the temperature of the oven chamber 14 at a desired level. For example, the sealing structure 118 may restrict heat from exiting the oven chamber 14 so the temperature of the oven chamber 14 remains within a temperature range of five to ten degrees Fahrenheit, which in some embodiments is acceptable as a "near-constant" temperature.

With reference now to FIG. 5, the illustrated closure mechanism 74 further includes a biasing structure 146 having a first portion 150 coupled to the first plurality of connection tabs 62 and a second portion 154 coupled to the second plurality of connection tabs 66. Each of the first and second portions 150, 154 of the biasing structure 146 include a body 158 that defines connection apertures 160 sized to receive the connection tabs 62, 66 of respective support brackets 50, 54. The first and second portions 150, 154 of the biasing structure 146 are constructed with a plurality of rigid bodies 158, each of which spans a top portion of one, and in some cases two or more lengthwise-adjacent ones, of the plates 86 of the first and second plurality of plates 78, 82, respectively. For example, as illustrated in FIG. 4, the illustrated body 158 spans at least a portion of three adjacent plates 86. For example, the body 158 may be coupled to the connection tabs 62, 64 in an offset manner such that the body 158 spans across a portion of the first plate 86 (e.g., approximately half of the plate 86), the entire second plate (e.g., the plate adjacent to and downstream the first plate), and a portion (e.g., approximately half) of the third plate (e.g., the plate downstream the second plate). In other embodiments, the body 158 may span at least a portion of fewer (e.g., one or two plates) or more plates 86 (e.g., four, five, etc.) to effectively urge the sealing structure 118 towards the closed position (FIG. 5), e.g., solely by gravitational weight.

In the illustrated embodiment, the rigid bodies 158 of the biasing structure are placed on top of the sealing structure 118 to urge the sealing structure 118 towards the closed position (FIG. 3). As illustrated in FIG. 3, in some embodiments a clearance 160, measured widthwise across the slot 38, is formed between the bodies 158 of first and second portions 150, 154 of the biasing structure 146 so the conveyor hanger 46 may move through the slot 38 with minimal contact between the conveyor hanger 46 and the bodies 158. For example, the clearance 160 may be sized to match a width of the conveyor hanger 46. As described in more detail below, the clearance 160 allows the bodies 158 of the first and second portions 150, 154 of the biasing structure 146 to remain in contact with the sealing structure 118 downstream of the conveyor hanger 46 to ensure the slot 38 of the oven chamber 14 remains closed.

With reference to FIG. 6A-6E, the movement of the conveyor hanger 46 through the slot 38 of the oven chamber 14 is illustrated. The first and second plurality of plates 78, 82 cooperate to define a first pair of plates 162 and a second pair of plates 166 positioned downstream of the first pair of plates 162 in an operational direction 168 of the conveyor hanger 46. The first and second pairs of plates 162, 166 each include one of the first plurality of plates 78 coupled to the first support bracket 50 and one of the second plurality of plates 82 coupled to the second support bracket 54. The engagement surfaces 106 of the first pair of plates 162 selectively contact each other to close a first portion of the slot 38, and the engagement surfaces 106 of the second pair of plates 166 selectively contact each other to close a second portion of the slot 38. In the illustrated embodiment, the counterweight portion of each plate 86 of the first and second pairs of plates 162, 166 urges the engagement surfaces 106 of the first and second pairs of plates 162, 166 into contact with each other to close the slot 38.

Figure 6A:
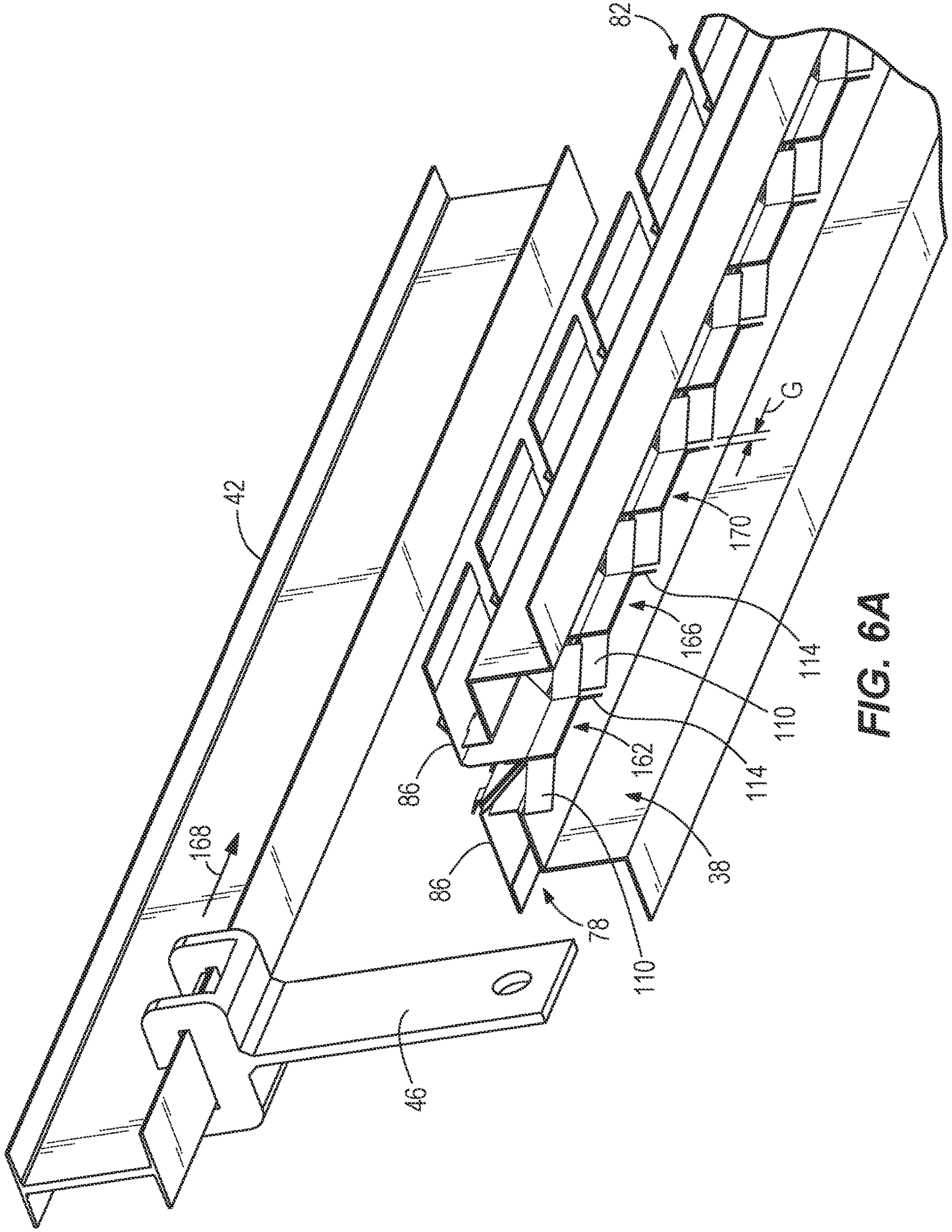
FIG. 6A is a perspective view of the slot with the closure mechanism of FIGS. 3-5 in a closed position when a conveyor hanger is positioned outside of the oven chamber.
Figure 6B:
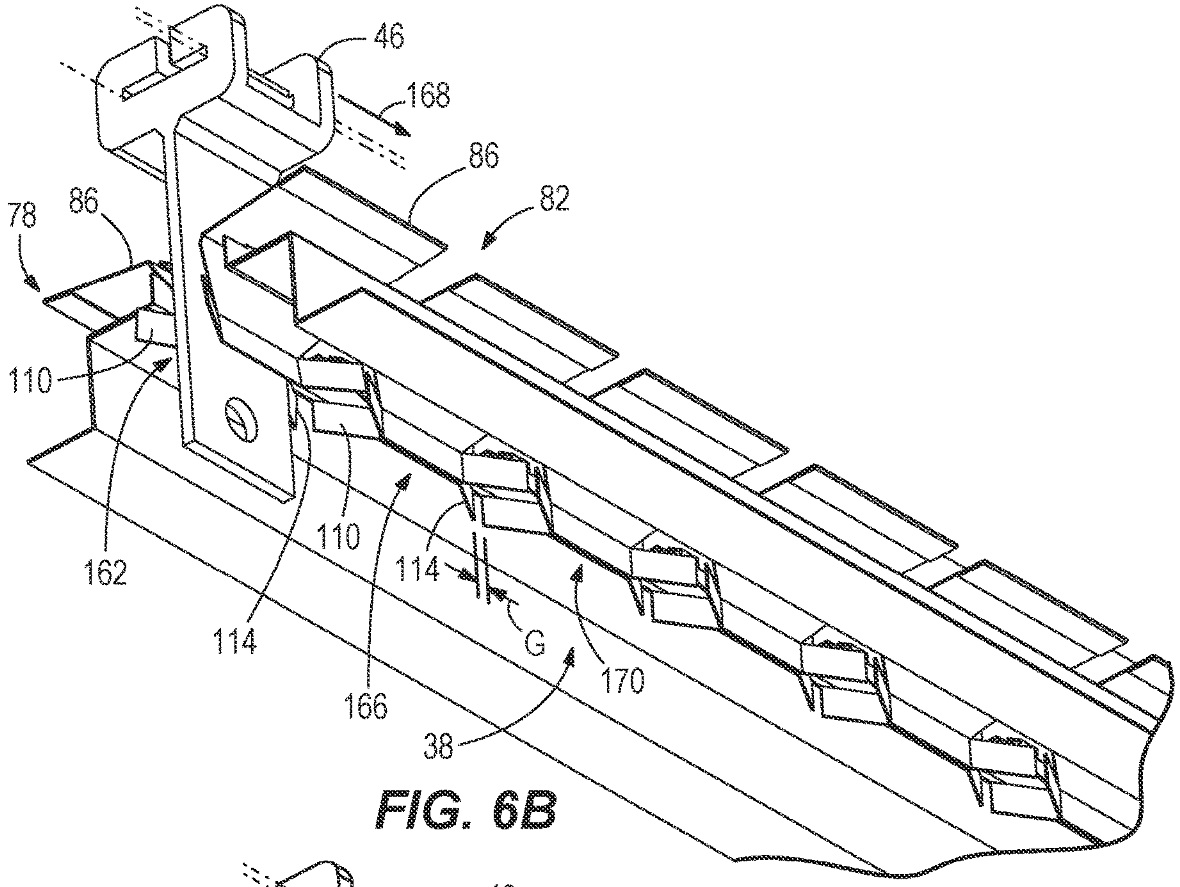
FIG. 6B is a perspective view of the slot with a portion of the closure mechanism of FIG. 3-5 in an open position as the conveyor hanger moves in a first operational direction.

FIG. 6A illustrates the closure mechanism 74 in a resting or closed position (e.g., when the conveyor hanger 46 is outside of the oven chamber 14). As the conveyor hanger 46 moves through the slot 38, the conveyor hanger 46 passes through the first angled tabs 110 of the first pair of plates 162 (FIG. 6B) and contacts the engagement surfaces 106 of the first pair of plates 162. Once the conveyor hanger 46 contacts the engagement surfaces 106, each plate 86 of the first pair of plates 162 respectively pivots relative to the first and second support brackets 50, 54. The conveyor hanger 46 is pinched directly between the two ends 138 (FIG. 3) of the portion of the sealing structure 118 (FIG. 5) that spans the first pair of plates 162. In other words, the two ends 138 of the sealing structure 118 that span the first pair of plates 162 deform or separate so the conveyor hanger 46 may move through the first pair of plates 162. At the same time, the remainder of the sealing structure 118 is urged towards the closed position by the biasing structure 146. In other words, only a portion of the closure mechanism 74 is in an open position (e.g., the first pair of plates 162) while the remainder of the closure mechanism 74 is in the closed position. For example, the clearance 160 (FIG. 3) between the bodies 158 of the first and second portions 150, 154 of the biasing structure 146 makes it so the conveyor hanger 46 minimally contacts the bodies 158, if at all. As a result, the second pair of plates 166 remain in the closed position (FIG. 6B) while the first pair of plates 162 are pivoted to the open position.

Figure 6C:
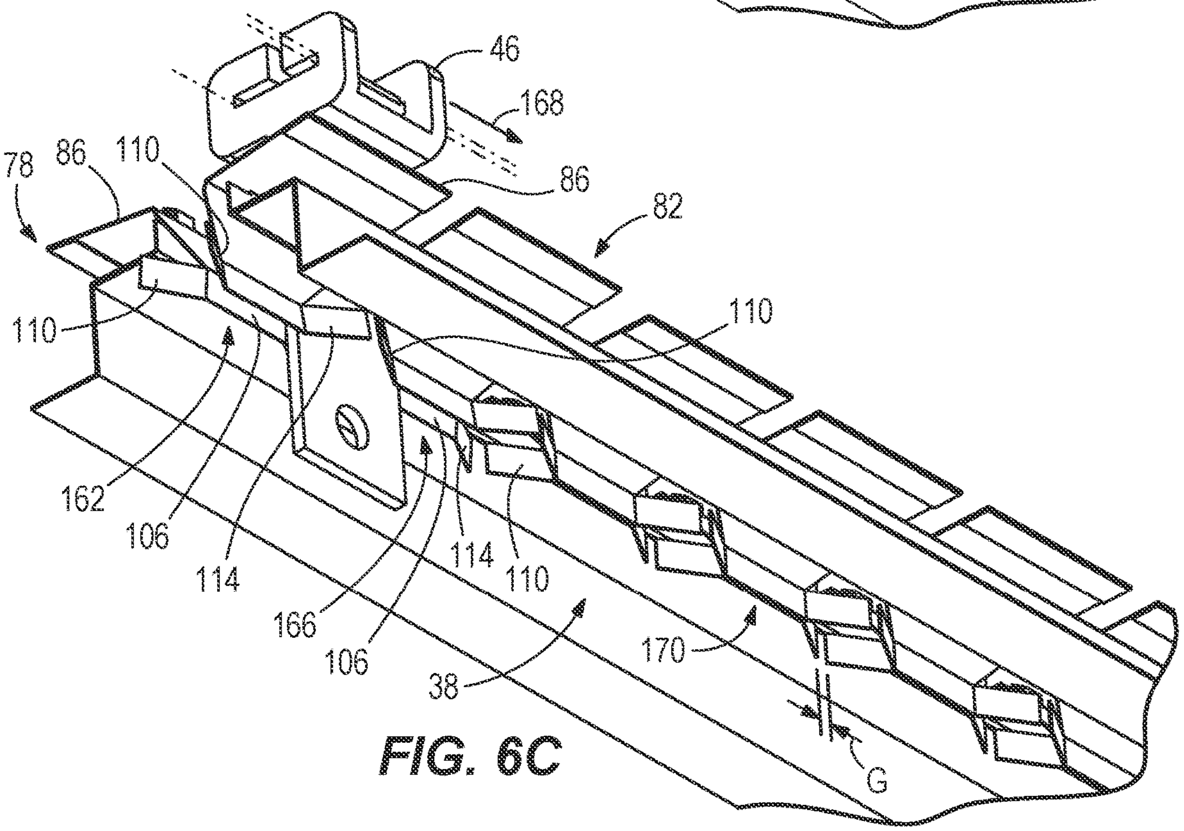
FIG. 6C is a perspective view of the slot with a portion of the closure mechanism of FIG. 3-5 in an open position as the conveyor hanger continues to move in the first operational direction.

FIG. 6C illustrates the conveyor hanger 46 moving in the operational direction 168 and positioned between the first and second pair of plates 162, 166. In this position, the conveyor hanger 46 contacts the first angled tab 110 of the second pair of plates 166 to separate the engagement surfaces 106 of the second pair of plates 166. In this position, the conveyor hanger 46 is pinched directly between the two ends 138 of a portion of the sealing structure 118 adjacent both of the first and second pairs of plates 162, 166, while a third pair of plates 170 remains in the closed position. As a result, only a small portion of the sealing structure 118 is open, which limits the amount of heat that releases from the oven chamber 14.

Figure 6D:
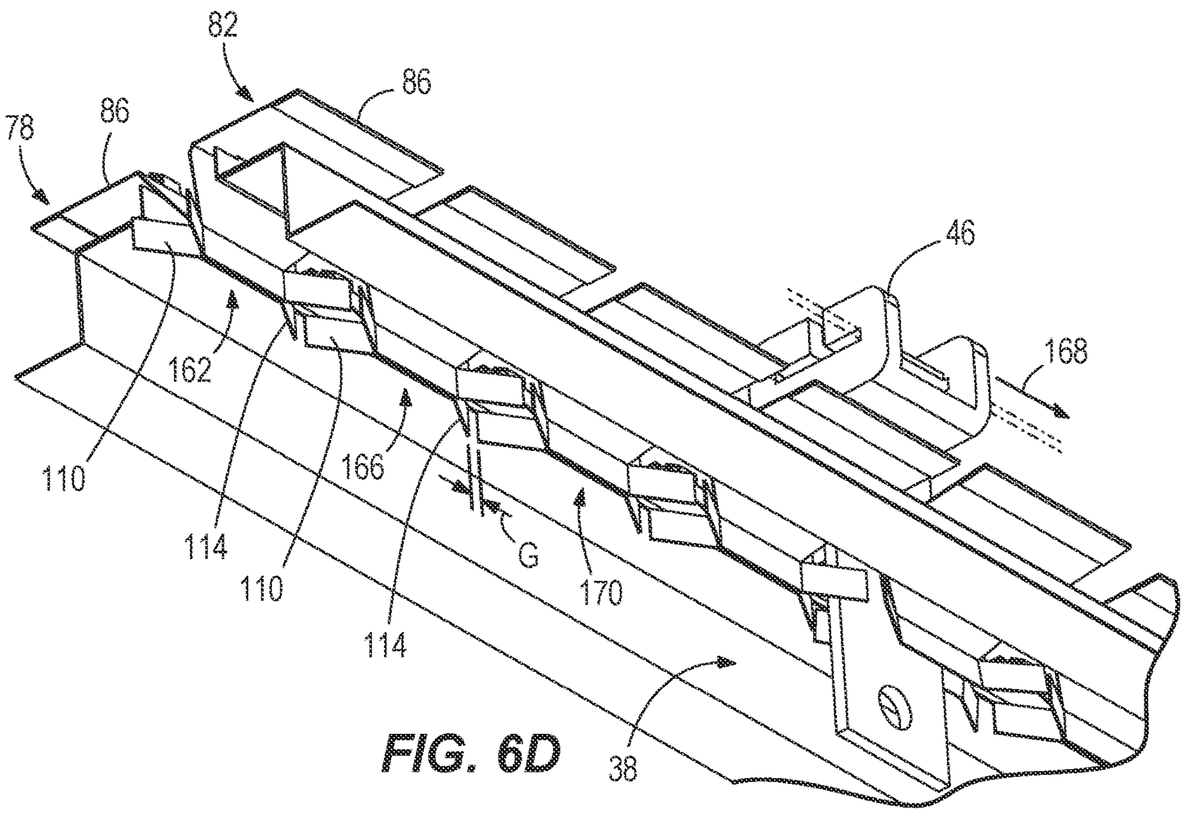
FIG. 6D is a perspective view of the slot with a portion of the closure mechanism of FIG. 3-5 in an open position as the conveyor hanger continues to move in the first operational direction.
Figure 6E:
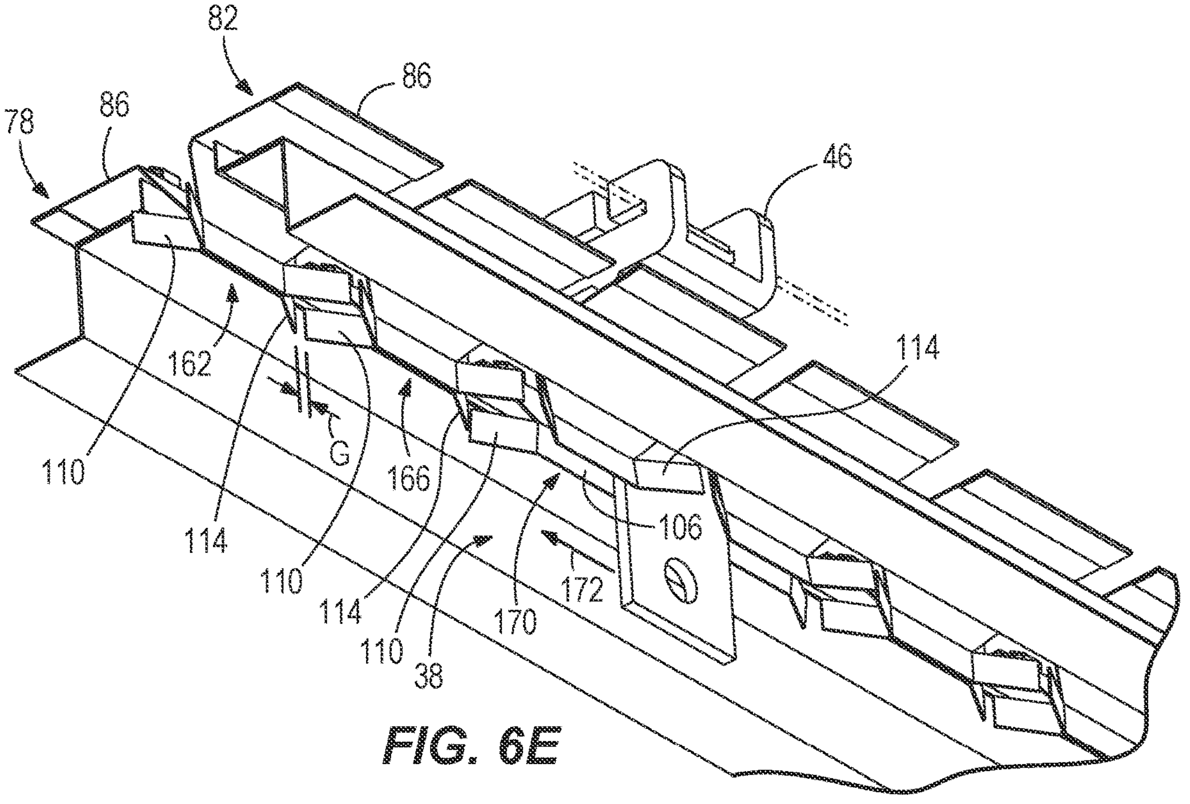
FIG. 6E is a perspective view of the slot with a portion of the closure mechanism of FIG. 3-5 in an open position as the conveyor hanger moves in a second operational direction.

FIG. 6D illustrates the conveyor hanger 46 in yet a further advanced position, which may be near an end portion of the slot 38. In this position, the plates 86 in an upstream position (e.g., that the conveyor hanger 46 already passed through) return to the closed position. FIG. 6E illustrates the conveyor hanger 46 moving in a second operational direction 172 that is directly opposite the first operational direction 168. When the conveyor hanger 46 moves in the second operational direction 172, the conveyor hanger 46 contacts the second angled tabs 114 to separate the engagement surfaces 106 of the plates 86. The conveyor hanger 46 is, therefore, able to move bi-directionally (e.g., in both the first and second operational directions 168, 172). In some embodiments, allowing the conveyor hanger 46 to move bi-directionally allows an operator of the oven system 10 to service the oven system 10, although other benefits are achieved with this functionality as well.

Although the illustrated embodiment of FIGS. 1-5 includes a sealing structure 118 and a biasing structure 146 as described above, in other embodiments the sealing structure 118 and/or the biasing structure 146 are not used. In such embodiments, a number of advantages of the overall closure mechanism 74 are still achieved.

Now with reference to FIGS. 1-5, a method of assembling the oven system 10 is discussed. The method includes securing the first and second support brackets 50, 54 proximate the first and second edge portions 32 (FIG. 3) of the top wall 22 of the oven chamber 14 so the support brackets 50, 54 extend longitudinally along the length of the top wall 22. In some embodiments, the support brackets 50, 54 respectively include the connection tabs 62, 64 spaced at intervals along the length of the top wall 22. In other embodiments, the connection tabs 62, 64 may be secured to the top wall 22 directly. The closure mechanism 74 is coupled to the connection tabs 62, 64 to inhibit heat from being released out of the oven chamber 14. In the illustrated embodiment, coupling the closure mechanism includes respectively coupling the first and second plurality of plates 78, 82 to the connection tabs 62, 64 by inserting one of the connection tabs 62 within the connection aperture 94 of each of the first and second plurality of plates 78, 82. When the first and second plurality of plates are coupled to the connection tabs 62, 64, the engagement surfaces 106 of the each of the first and second plurality of plates 78, 82 cooperate with each other to close the slot 38 and define the first pair of plates 162 and the second pair of plates 166 (FIG. 6A) positioned downstream the first pair of plates 162 in an operational direction 168 of the conveyor hanger 46.

The first and second portions 122, 126 of the sealing structure 118 are respectively coupled to the connection tabs 62, 66 and span the top portion of the first and second plurality of plates 78, 82 so the gap G between respective plates 86 of the first and second plurality of plates 78, 82 are covered. The first and second portions 150, 154 of the biasing structure 146 are also respectively coupled to the connection tabs 62, 66, and are positioned on top of the sealing structure 118 to urge the sealing structure 118 towards a closed position.

Figure 8:
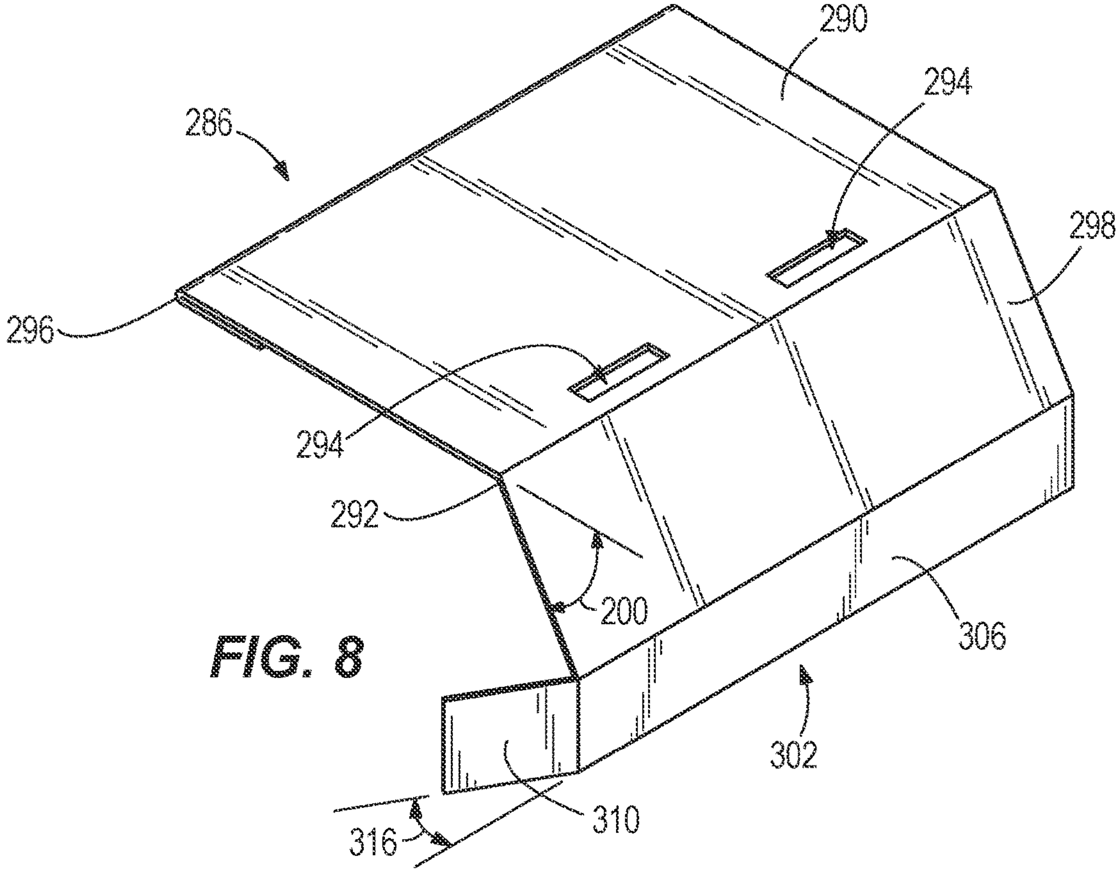
FIG. 8 is a perspective view of a plate according to another embodiment of the closure mechanism.
Figure 9A:
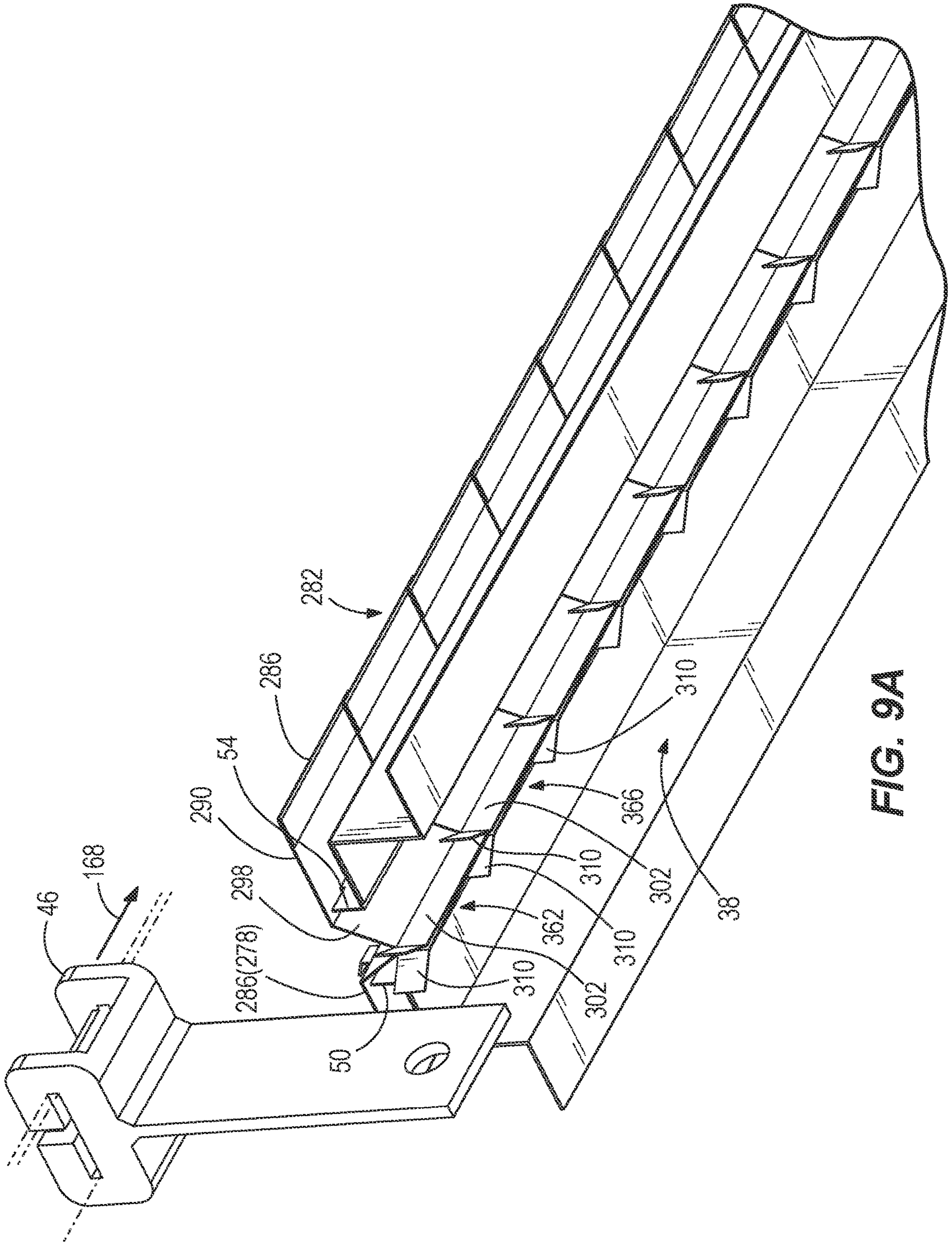
FIG. 9A is a perspective view of the slot having a plurality of the plates of FIG. 8 in a closed position when a conveyor hanger is positioned outside of the oven chamber.

FIG. 8 illustrates a plate 286 according to another construction. Although a number of similarities are present between the plate 286 and the plate 86 of FIGS. 3-7 (including the alternative features 86 of the plate 86 also described above), the plate 286 is used to form a self-sealing closure mechanism that closes or seals the slot 38 without the need of any additional sealing or biasing structures used in the closure mechanism 74 in the embodiment of FIGS. 1-7. Common features of the plate 286 are given common reference numbers in the 200-series of reference numbers. The plate 286 can be attached to similar first and second support brackets 50, 54 as the plate 86 described above. Each plate 286 includes a connection portion 290 defining a connection aperture 294, an angled portion 298 extending downward from the connection portion 290, an engagement portion 302 extending downward from the angled portion 298 to form an engagement surface 306, and an angled tab 310 extending from an upstream portion of the engagement portion 302 relative to an operational direction 168 (FIG. 9A). The connection aperture 294 of the plate 286 is sized to receive the connection tabs 62, 66 (FIGS. 4 and 5) so the plate 286 can be secured to at least one of the first and second plurality of connection tabs 62, 66.

When the plate 286 is coupled to one of the connection tab 62, 66, the connection portion 290 has a first end 292 positioned within the width W (FIG. 3) of the slot 38 and a second end 296 that extends a distance beyond the width W of the slot 38. Each connection aperture 294 is positioned proximate the first end 292 of the connection portion 290 to define a fulcrum about which each plate 286 pivots. The connection portion 290 extends a distance beyond the connection tabs 62, 66 to the second end 296 of the plate 286 to define a lever or counterweight portion that urges the plate 286 towards a resting or closed position (FIG. 9A) without the need of an additional spring force or biasing member. In the illustrated embodiment, the second end 296 of the plate 286 has a folded portion that increases a gravitational weight force of the second end 296 of the connection portion 290 to form the counterweight portion. The counterweight portion opposes the gravitational weight of a portion of the plate 286 positioned within the slot 38 (e.g., the angled portion 298, the engagement portion 302) so the plate 286 is urged towards the closed position (FIG. 9A). In other words, the counterweight portion creates a moment of force on the fulcrum that each plate 286 pivots that is approximately equal to or greater than a moment of force created by the portion of the plate 286 positioned within the slot 38 to urge the plate 286 towards the closed position.

The angled portion 298 defines a first end that extends from the connection portion 290 at an angle 200. In some embodiments, the angle 200 may be in a range from 45 degrees to 70 degrees. In the illustrated embodiment, the angle 200 is in a range from 55 degrees to 65 degrees. The angled portion 298 extends from the first end to define a second end that is positioned in the illustrated embodiment approximately midway within the width of the slot 38. The engagement portion 302 extends from the angled portion 298 in the illustrated embodiment such that the engagement portion 302 is positioned approximately midway within the width W of the slot 38, and is perpendicular to the connection portion 290. In other words, the engagement portion 302 is positioned at a point between the first and second edges 32 (FIG. 3) of the top wall 22 that is within the width of the slot 38.

The angled tab 310 extends from the engagement portion 102 at an angle 316 relative to the engagement portion 302. The angled tab 310 extends from the engagement portion 302 towards one of the edge portions 32 (FIG. 3) of the top wall 22. In some embodiments, the angle 316 may be in a range from 20 degrees to 40 degrees. In the illustrated embodiment, the angle 316 is in a range from 25 to 35 degrees. Since the plates 286 of the illustrated embodiment of FIG. 8 each includes only a single angled tab, the plates 286 are adapted for movement of conveyor hangers 46 in a single operational direction 168 (FIG. 9), rather than bi-directionally as described above with reference to the closure mechanism 74.

With reference to FIG. 9A, the plates 286 are arranged on first and second support brackets 50, 54 to define a first plurality of plates 278 and a separate second plurality of plates 282. Each plate 286 is respectively configured to pivot relative to the first and second support brackets 50, 54 to selectively close the slot 38 of the oven chamber 14. The first and second pluralities of plates 278, 282 cooperate to define a first pair of plates 362 and a second pair of plates 366 positioned downstream the first pair of plates 362, and so forth with additional cooperating plate pairs, in an operational direction 168 of the conveyor hanger 46. The first and second pairs of plates 362, 366 each include one of the first plurality of plates 278 coupled to the first support bracket 250 and one of the second plurality of plates 282 coupled to the second support bracket 254. Since each of the plates 286 includes a single angled tab 310 instead of a pair of angled tabs 110, 114, the angled tab 310 of each plate of the second pair of plates 366 overlaps the engagement portion 302 of the directly adjacent plate of the first pair of plates 362 in the operational direction 168 of the slot 38. Therefore, when the first and second pluralities of plates 278, 282 cooperate with each other in the resting or closed position (FIG. 9A) the slot 38 of the oven chamber 14 is fully closed or sealed. In other words, the sealing structure 118 and the biasing structure 146 of the closure mechanism 74 are not necessarily needed to inhibit heat from releasing out of the oven chamber 14. However, it should be appreciated that the sealing structure 118 and the biasing structure 146 may be used in conjunction with the plates 286 to further inhibit heat from releasing out of the oven chamber 14.

Figure 9B:
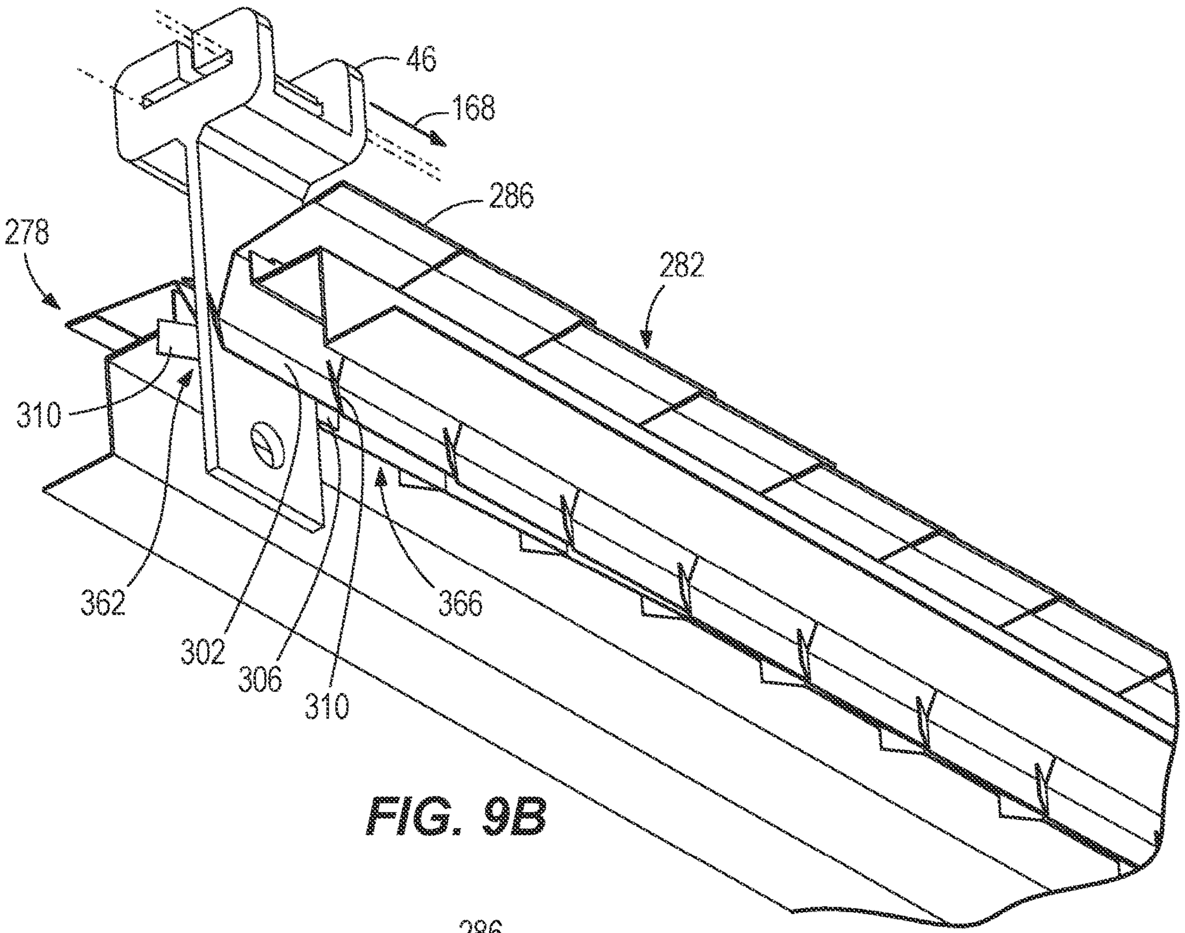
FIG. 9B is a perspective view of the slot having a plurality of the plates of FIG. 8 in an open position as the conveyor hanger moves in an operational direction.
Figure 9C:
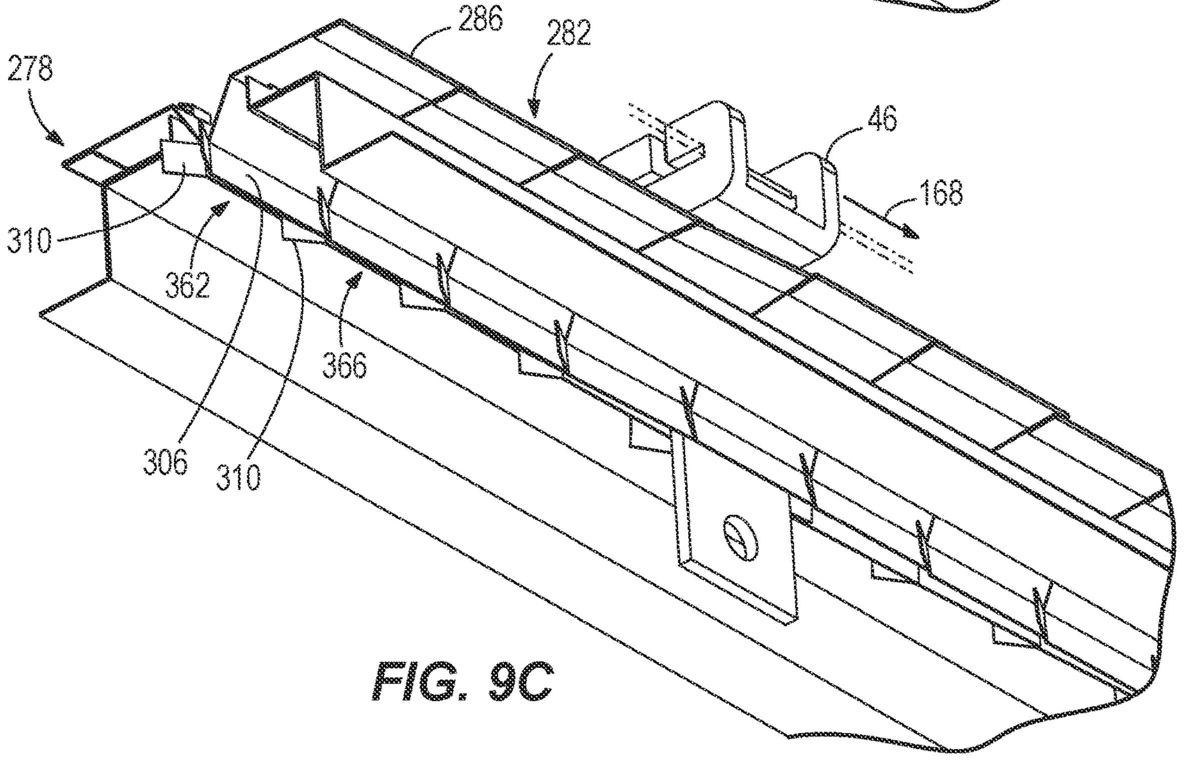
FIG. 9C is a perspective view of the slot having a plurality of the plates of FIG. 8 in an open position as the conveyor hanger continues to move in an operational direction.

With reference to FIGS. 9A-9C, movement of the conveyor hanger 46 through the slot 38 is illustrated. FIG. 9A illustrates the first and second pluralities of plates 278, 282 in a resting or closed position (e.g., when the conveyor hanger 46 is not positioned within the slot 38). As the conveyor hanger 46 moves through the slot 38, the conveyor hanger 46 passes through the angled tabs 310 of the first pair of plates 362 (FIG. 9B) and contacts the engagement surfaces 306 of the first pair of plates 362. Once the conveyor hanger 46 contacts the engagement surfaces 306, each plate 286 of the first pair of plates 362 respectively pivots relative to the first and second support brackets 50, 54. Since the angled tab 310 of the second pair of plates 366 overlaps the engagement portion 302 of the first pair of plates 362 in the longitudinal direction of the slot 38, the engagement portion 302 of the first pair of plates 362 contacts the angled tab 310 of the second pair of plates 366 to open the second portion of the slot 38 while the conveyor hanger 46 moves through the first portion of the slot 38. As the conveyor hanger 46 moves downstream (FIG. 9C), the first and second pair of plates return to the closed position.

It should be appreciated that the method of assembling the oven system 10 with the plates 286 is similar to the method discussed above with reference to FIGS. 1-5, with the exception that the separate sealing structure 118 and the biasing structure 146 of the closure mechanism 74 may optionally be omitted.

Various aspects of the invention are set forth in the following claims.

What is claimed is:

1. A closure mechanism to inhibit escape of heat from an oven chamber of a conveyor oven having a conveyor hanger, the closure mechanism configured to be coupled to a first plurality of connection tabs arranged along a first edge portion of a top wall of the conveyor oven and a second plurality of connection tabs arranged along a second edge portion of the top wall of the conveyor oven, the closure mechanism positioned within a slot formed between the first and second edge portions, the closure mechanism comprising:

a plurality of plates configured to couple to each of the first and second pluralities of connection tabs of the conveyor oven and being spaced along a longitudinal length of the slot to selectively enclose the slot of the conveyor oven, the plurality of plates defining a first plurality of plates with each coupled to each of the first plurality of connection tabs and a second plurality of plates with each coupled to each of the second plurality of connection tabs, each of the plurality of plates comprising:

a connection portion defining a connection aperture that couples said each of the plurality of plates to at least one of the first or second plurality of connection tabs;

an angled portion configured to extend downward from the connection portion within the slot of the conveyor oven; and an engagement portion extending downward from the angled portion to form an engagement surface such that the first and second pluralities of plates define respective engagement surfaces that contact each other to close the slot of the conveyor oven.

2. The closure mechanism of claim 1, wherein the first and second pluralities of plates cooperate to define a first pair of plates and a second pair of plates positioned downstream of the first pair of plates in an operational direction of the conveyor hanger, wherein the first and second pairs of plates each include one of the first plurality of plates coupled to the first plurality of connection tabs and one of the second plurality of plates coupled to the second plurality of connection tabs.

3. The closure mechanism of claim 2, wherein the engagement surfaces of the first pair of plates selectively contacts each other to close a first portion of the slot, and the engagement surfaces of the second pair of plates selectively contacts each other to close a second portion of the slot.

4. The closure mechanism of claim 2, wherein the closure mechanism further comprises a sealing structure having a body formed of an elastomeric material that spans a top portion of the plurality of plates, wherein the sealing structure includes a first portion coupled to the first plurality of connection tabs and a second portion coupled to the second plurality of connection tabs, wherein the first and second portions are respectively configured to be positioned on top of the plurality of plates to cover a gap between first and second pairs of plates to close the slot of the oven chamber.

5. The closure mechanism of claim 4, wherein the closure mechanism further comprises a biasing structure having a first portion coupled to the first plurality of connection tabs and a second portion coupled to the second plurality of connection tabs, wherein the first and second portions are configured to be positioned on top of the sealing structure to urge the sealing structure towards a closed position.

6. The closure mechanism of claim 2, further comprising an angled tab that extends from an upstream portion of the engagement portion in relation to an operational direction of the conveyor hanger towards one of the first edge portion or the second edge portion of the top wall.

7. The closure mechanism of claim 6, wherein the angled tab of the second pair of plates overlaps the engagement portions of the first pair of plates in a longitudinal direction of the slot so the engagement portions of the first pair of plates are configured to contact the angled tabs of the second pair of plates to open the second portion of the slot while the conveyor hanger moves through the first portion of the slot.

8. The closure mechanism of claim 6, wherein the angled tab is a first angled tab, and each plate comprises a second angled tab that extends from a downstream portion of the engagement portion, wherein the first and second pairs of plates are spaced apart in a longitudinal direction of the slot to define a gap so the second angled tab of the first pair of plates does not contact the first angled tab of the second pair of plates, thus allowing the conveyor hanger to move in both a first direction and a second direction.

9. A closure mechanism inhibit heat from releasing out of an oven chamber of a conveyor oven having a conveyor hanger, the closure mechanism configured to be coupled to a first plurality of connection tabs arranged along a first edge portion of a top wall of the conveyor oven and a second plurality of connection tabs arranged along a second edge portion of the top wall of the conveyor oven, the closure mechanism positioned within a slot formed between the first and second edge portions, the closure mechanism comprising:

a plurality of plates configured to couple to each of the first and second pluralities of connection tabs of the conveyor oven and being spaced along a longitudinal length of the slot to selectively enclose the slot of the conveyor oven, the plurality of plates defining a first plurality of plates with each coupled to each of the first plurality of connection tabs and a second plurality of plates with each coupled to each of the second plurality of connection tabs, the first and second pluralities of plates cooperating to define a first pair of plates and a second pair of plates positioned downstream of the first pair of plates in an operational direction of the conveyor hanger, the first and second pairs of plates each including one of the first plurality of plates coupled to the first plurality of connection tabs and one of the second plurality of plates coupled to the second plurality of connection tabs, each of the plurality of plates comprising:

a connection portion defining a connection aperture that couples said each of the plurality of plates to at least one of the first or second plurality of connection tabs;

an angled portion extending downward from the connection portion within the slot of the conveyor oven;

an engagement portion extending downward from the angled portion to form an engagement surface such that the first and second pluralities of plates define respective engagement surfaces that contact each other to close the slot of the conveyor oven; and a sealing structure having a body formed of an elastomeric material that spans a top portion of the pluralities of plates, the sealing structure having a first portion coupled to the first plurality of connection tabs and a second portion coupled to the second plurality of connection tabs, wherein the first and second pairs of plates are spaced apart in a longitudinal direction of the slot to define a gap between the first and second pairs of plates to allow the conveyor hanger to move in both a first direction and a second direction, and wherein the first and second portions of the sealing structure cover the gap between respective plates to close the slot of the oven chamber and inhibit heat from escaping the oven chamber.

10. The closure mechanism of claim 9, further comprising a first angled tab that extends from an upstream portion of the engagement portion in relation to the operational direction of the conveyor hanger towards one of the first edge portion or the second edge portion of the top wall, and a second angled tab that extends from a downstream portion of the engagement portion in relation the operational direction of the conveyor hanger towards one of the first edge portion or the second edge portion of the top wall.

11. The closure mechanism of claim 10, wherein the gap is defined between the first and second angled tabs.

12. The closure mechanism of claim 9, wherein the closure mechanism further comprises a biasing structure having a first portion coupled to the first plurality of connection tabs and a second portion coupled to the second plurality of connection tabs, wherein the first and second portions are positioned on top of the sealing structure to urge the sealing structure towards a closed position.

13. A closure mechanism inhibit heat from releasing out of an oven chamber of a conveyor oven having a conveyor hanger, the closure mechanism configured to be coupled to a first plurality of connection tabs arranged along a first edge portion of a top wall of the conveyor oven and a second plurality of connection tabs arranged along a second edge portion of the top wall of the conveyor oven, the closure mechanism positioned within a slot formed between the first and second edge portions, the closure mechanism comprising:

a plurality of plates configured to couple to each of the first and second pluralities of connection tabs of the conveyor oven and being spaced along a longitudinal length of the slot to selectively enclose the slot of the conveyor oven, the plurality of plates defining a first plurality of plates with each coupled to each of the first plurality of connection tabs and a second plurality of plates with each coupled to each of the second plurality of connection tabs, the first and second pluralities of plates cooperating to define a first pair of plates and a second pair of plates positioned downstream of the first pair of plates in an operational direction of the conveyor hanger, the first and second pairs of plates each including one of the first plurality of plates coupled to the first plurality of connection tabs and one of the second plurality of plates coupled to the second plurality of connection tabs, each of the plurality of plates comprising:

a connection portion having a first end positioned within the slot and a second end that extends a distance beyond the slot, the connection portion defining a connection aperture configured to couple said each of the plurality of plates to at least one of the first or second plurality of connection tabs; and an engagement portion extending downward relative to the connection portion to form an engagement surface such that the first and second pluralities of plates define respective engagement surfaces that contact each other to close the slot of the conveyor oven.

14. The closure mechanism of claim 13, further comprising an angled portion extending downward from the connection portion within the slot of the conveyor oven, and wherein the angled portion connects the connection portion to the angled portion.

15. The closure mechanism of claim 13, wherein the second end of the connection portion defines a counterweight portion that urges each of the plurality of plates towards a resting or closed position.

16. The closure mechanism of claim 15, wherein the second end of connection portion has a folded portion that increases a gravitational weight force of the second end of the connection portion to form the counterweight portion.

17. The closure mechanism of claim 13, further comprising a sealing structure having a body formed of an elastomeric material that spans a top portion of the pluralities of plates, the sealing structure having a first portion coupled to the first plurality of connection tabs and a second portion coupled to the second plurality of connection tabs.

18. The closure mechanism of claim 17, wherein the first and second pairs of plates are spaced apart in a longitudinal direction of the slot to define a gap between the first and second pairs of plates to allow the conveyor hanger to move in both a first direction and a second direction.

19. The closure mechanism of claim 18, wherein the first and second portions of the sealing structure cover the gap between respective plates to close the slot of the oven chamber and inhibit heat from escaping the oven chamber.

* * * * *